United States Patent [19]

Jacino et al.

[11] Patent Number: 4,961,883
[45] Date of Patent: Oct. 9, 1990

[54] GLASS BREAK REPAIR APPARATUS VALVE AND METHOD

[76] Inventors: Gerald Jacino, 85-19 118 St., Kew Gardens, N.Y. 11415; Anthony Jacino, 17 Normandie La., East Moriches, N.Y. 11940

[21] Appl. No.: 323,352

[22] Filed: Mar. 14, 1989

[51] Int. Cl.⁵ .................. B29C 45/14; B32B 35/00
[52] U.S. Cl. ............................. 264/36; 156/94; 156/382; 264/102; 425/12; 425/13
[58] Field of Search ............ 264/36, 102; 425/12, 425/13; 156/94, 382; 222/478, 479; 604/248; 251/208, 209, 304

[56] References Cited

U.S. PATENT DOCUMENTS

| | | | |
|---|---|---|---|
| 2,261,213 | 11/1941 | Bierman | 604/248 |
| 2,615,607 | 10/1952 | Huskey | 222/479 |
| 2,854,027 | 9/1958 | Kaiser et al. | 604/248 |
| 3,012,752 | 12/1961 | Buck | 604/248 |
| 3,562,366 | 2/1971 | Sohl | 264/23 |
| 3,765,975 | 10/1973 | Hollingworth | 264/102 |
| 3,834,372 | 9/1974 | Turney | 604/248 |
| 3,993,520 | 11/1976 | Werner et al. | 425/13 |
| 4,032,272 | 6/1977 | Miller | 425/12 |
| 4,047,863 | 9/1977 | McCluskey | 264/36 |
| 4,132,516 | 1/1979 | Storey | 425/13 |
| 4,200,478 | 4/1980 | Jacino et al. | 264/36 |
| 4,280,861 | 7/1981 | Schwartz | 264/36 |
| 4,555,295 | 11/1985 | Orikasa et al. | 156/94 |
| 4,597,727 | 7/1986 | Birkhauser, III | 264/36 |
| 4,689,047 | 8/1987 | Bauer | 604/248 |
| 4,775,365 | 10/1988 | Swartz | 604/248 |
| 4,793,695 | 6/1988 | Alexander et al. | 156/94 |
| 4,840,551 | 6/1989 | Lay et al. | 425/12 |

FOREIGN PATENT DOCUMENTS

| | | | |
|---|---|---|---|
| 536495 | 1/1957 | Canada | 264/36 |
| 0034313 | 8/1981 | European Pat. Off. | 137/625 |

Primary Examiner—Jeffery Thurlow
Assistant Examiner—Mathieu Vargot
Attorney, Agent, or Firm—Auslander & Thomas

[57] ABSTRACT

In the repair of breaks in glass a valve is employed in conjunction with a syringe to accumulate vacuum, apply pressure or accumulate pressure, for more effective, easier and less expensive repair. Tubing may be used to enable remote actuation of the apparatus or use of the system or method. The syringe cooperates with an adhesively attached pedestal with a chamber.

14 Claims, 1 Drawing Sheet

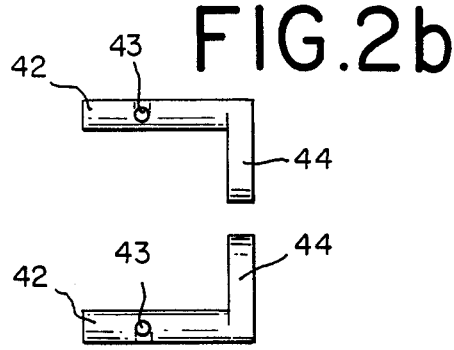
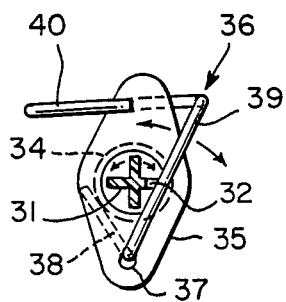
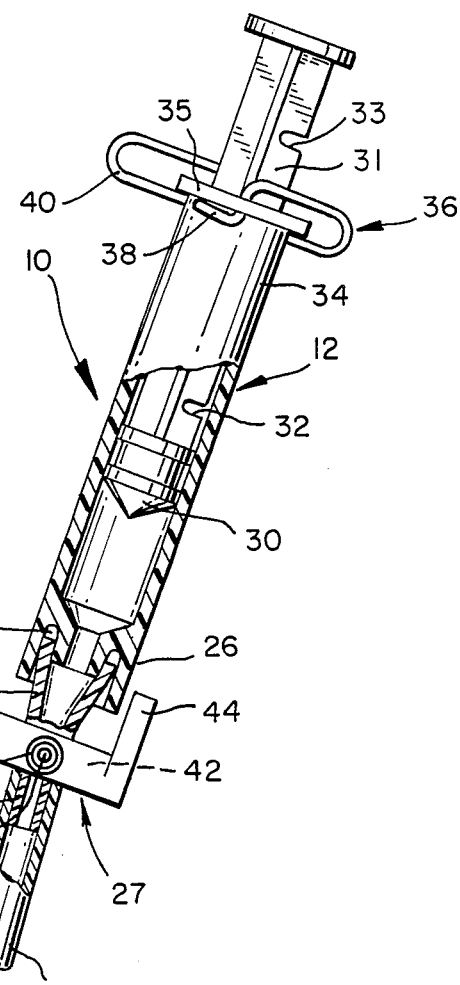
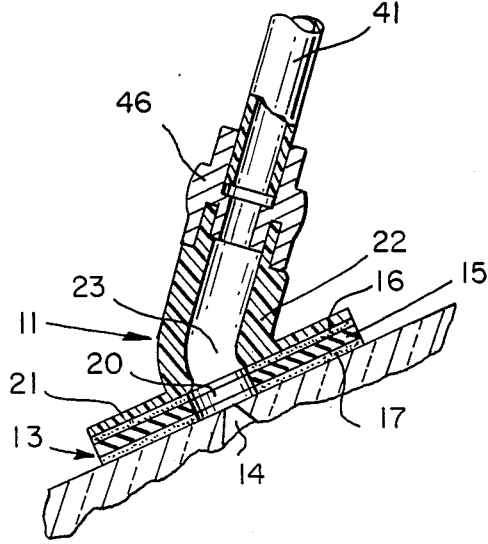

GLASS BREAK REPAIR APPARATUS VALVE AND METHOD

BACKGROUND OF THE INVENTION

The present invention relates to an improved glass break repair apparatus and method.

Glass breaks or cracks, such as in automobile windshields, or even plate glass, mar the visibility through the glass, but oftentimes do not affect the usability of the glass. In many instances, such breaks or cracks themselves can be repaired, substantially restoring the visibility through the glass, obviating very expensive and time-consuming replacement of the entire glass which includes the break or crack.

One of the problems in glass breaks or cracks is that the rough edges of the area and the crack striations refract light in patterns different from the normal refraction of the glass, impeding or destroying the normal visibility of the glass.

The problems of glass breaks are substantially the same in automobile windshields or plate glass insofar as visibility is concerned. The main difference between a windshield and plate glass is that a windshield or other automobile glass is made of safety glass.

Safety glass is usually a lamination of two plates of glass sandwiching a transparent binder, a crack in a windshield usually only affects the outer plate of the lamination and does not go through the entire lamination.

A crack in the plate glass differs primarily in that it goes through the entire plate, since there is not lamination.

It has been found that glass breaks can be filled with transparent resins which protect the formerly broken areas and which substantially restore the visibility to the repaired area. Such repair has required complicated mounting devices, complicated pumps for drawing air and creating pressure and other expensive equipment. The equipment was also so complicated that only experienced operators could use such equipment.

Notwithstanding equipment of the past and professional repairs, oftentimes striations of somewhat irregular cracks were unable to be properly repaired because of the difficulty of getting the resin to penetrate the striations of the crack.

Devices of the past required complex and expensive heat applications, ultra sound, pressure to place the devices or vacuum mounted jigs to position repair apparatus, among other things.

In the past, an improved system included a simple pedestal mountable over a break. The pedestal received a syringe which was sealed to the pedestal and was used to fill the crack with transparent resin. Where the break was through the entire thickness of the glass, particularly with plate glass, it was necessary to seal the other side of the glass in order to get proper resin penetration. In the past, the simplicity of the use of a syringe with a pedestal and its efficiency for pumping and drawing was a great advance in the technology.

The flange on the pedestal served as an effective interface between the seal and the glass with the break.

The present invention includes the use of a three-way valve with a syringe in the pumping system, instead of the prior art pin valve used in conjunction with a syringe. The syringe now is an unexpectedly more effective vacuum accumulating tool instead of a one-shot pump. Now one can continue to draw vacuum and hold it with the new valve configuration. To some extent pressure may also be able to be accumulated. One can draw vacuum, vent the syringe, hold the vacuum, then close the syringe, draw more vacuum and vent the syringe. This give greater flexibility over what has been available before, using a simple syringe. The present invention uses a simpler mechanism for effectively drawing vacuum and to some extent, accumulating pressure.

The accumulation of pressure can be effected, but is more difficult, since the resetting of the valve for additional pressure strokes allows some back pressure release into the when the plunger is withdrawn.

DESCRIPTION OF THE RELATED ART

U.S. Pat. No. 4,597,727 shows a similar device employing a syringe in a way consistent with the prior art. The patent also discloses a complex pumping device to the attached to a vacuum held device, vacuum held over a glass crack. The pump includes a complex arrangement of a pressure gauge and adjustable valves to switch the pump from drawing vacuum to pumping pressure. The pump may be attached through a tube to the element juxtaposed to the break in the glass. This is all distinguished from the simple use of the pedestal attached to the glass and the syringe of the present invention.

U.S. Pat. No. 4,280,861 is another prior art device employing a complicated vacuum held cup to engage a syringe with resin for repairing glass. The device has a complicated multiple pump and valve system for applying or accumulating vacuum or pressure in a special T fitting which also supports the syringe with the resin.

U.S. Pat. No. 3,765,975 also provides a vacuum fitting for holding a block juxtaposed to a break in a manner different from the present invention and does not permit the multiple drawing or pumping of the present invention.

U.S. Pat. No. 3,993,520 discloses a complex vacuum held device for repairing glass which employs a syringe for the injection of the resin.

U.S. Pat. No. 4,032,272 is another typical device, held by vacuum over the break in the glass.

U.S. Pat. No. 4,047,863 shows vacuum and pumping systems, but neither shows nor suggests the syringe and valve system of the present invention.

SUMMARY OF THE INVENTION

According to the present invention, a syringe is employed in the repair of a glass break, where a pedestal is adhesively affixed around the break. The invention is an improvement over U.S. Pat. No. 4,200,478, where the inclusion of a simple three way valve on the syringe enables multiple use of the plunger for selected drawing of vacuum or possible accumulating of pressure on the repair resin held in a chamber in the adhesively held pedestal in the course of repairing a glass break. The invention is particularly adapted to the remote use of the syringe connected to the pedestal by extended tubing.

The present invention provides apparatus for repairing a break in glass. The apparatus includes a pedestal with a flange and a chamber. The chamber has two openings, one of the openings is in the flange, the other opening functionally receives a syringe in airtight engagement. The chamber is of sufficient size to act as a reservoir for glass repair resin. An adhesive seals the pedestal in airtight engagement over a break in glass. The chamber should be in substantial communication with the glass break. There is a syringe which has a plunger with a stem and retainer for retaining the stem in selected fixed positions with relation to the body of the syringe. A valve is in airtight engagement between the chamber and the syringe. The valve is adapted to selectively communicate the syringe with the chamber, or seal the syringe and vent the chamber to the atmosphere, or seal the chamber and vent the syringe to atmosphere.

tubing may be in airtight engagement between the valve and the chamber and the valve may include one portion engaging the syringe in airtight engagement and another portion in airtight engagement with the tubing. The valve may include threads to engage the syringe and may include a rotor, a handle and a T opening. The rotor may be rotatable in a barrel.

The method for repairing a break in glass includes the steps of providing a pedestal including a flange and a chamber. The chamber is of sufficient size to act as a reservoir for the glass repair resin. The chamber has two openings, one opening in the flange, the other opening functionally engagable with a syringe which includes a plunger with a stem, and a stem retainer. A valve is provided which is selectively actuatable to communicate the syringe with the chamber or to seal the syringe and vent the chamber to the atmosphere or to seal the chamber and vent the syringe to atmosphere. The pedestal is adhesively sealed at its flange in airtight engagement over a break in glass with the chamber in substantial communication with the glass break. Glass repair resin is placed in the chamber. The valve is engaged, airtight between the chamber and the syringe. The plunger is selectively actuated and the stem retained in selected fixed position with relation to the body of the syringe. The valve is selectively actuated to communicate the syringe with the chamber or to seal the syringe and vent the chamber to the atmosphere or to seal the chamber and vent the syringe to atmosphere so that the resin is drawn into the break in the glass.

The method may include the steps of providing tubing and affixing the tubing in airtight engagement between the valve and the chamber, providing the valve including threads to engage the syringe, providing the valve with a rotor and handle, or providing the valve with a T opening. The rotor may be rotatable in a barrel.

BRIEF DESCRIPTION OF THE DRAWING

Although such novel feature of features believed to be characteristic of the invention are pointed out in the claims, the invention and the manner in which it may be carried out may be further understood by reference to the description following and the accompanying drawings.

FIG. 1 is a partially cut away section of a broken glass with a mounted pedestal and a remote syringe and valve connected to the pedestal by tubing.

FIGS. 2a through c are a detail of valve arm positions.

FIG. 3 is a detail top view of a syringe latch of the present invention.

DESCRIPTION OF THE FIGURES

Referring now to the figures in greater detail, where like reference numbers denote like parts in the various figures.

The glass repair apparatus 10 comprises a pedestal and a syringe 12. The pedestal 11 is mounted on a seal 13 which may be elastomeric, which may be centered over a break 14 in a glass.

The seal 13 includes several lamina. There is a basic layer 15 of an air impermeable substance such as rubber, with two adhesive layers 16 and 17. The adhesive layer 17 may be covered by a protective release paper (not shown). As can be seen in FIG. 1, there is a central opening 20 in the seal 13.

The pedestal 11 preferably has a flange portion 21 and a neck 22 which includes a chamber 23.

The syringe 12, preferably of plastic, is provided with a collar 26 and a recessed portion 24. A valve 27, as shown in FIG. 1, may be fraction fit and/or threadedly engaged over the recessed portion 24 and between the collar 26. The syringe 12 has a conventional plunger 30 on a stem 31. The stem 31 usually has an "X" cross section and preferably includes a lower notch 32 and an upper notch 33. On the body 34 of the syringe 12, the conventional flange 35 preferably includes latch 36.

The latch 36 can be seen in FIG. 3. as it pivots through an opening 37 in the flange 35 and has a lower arm 38 biased against the body 34. The upper arm 39 is formed into a keeper 40 folded over the flange 35 to limit the motion of the latch 36. The bias of the latch 36 causes it to engage the notch 32 or notch 33, according to the position of the stem 31. Disengagement is obtained by rotation of the stem 31 one way or the other, as indicated in FIG. 3. which flexes the latch 36 on the unnotched portion of the stem to cause disengagement.

A tube 41 is shown engaging the neck 22 of the pedestal 11 and leading to the syringe 12 where the tube 41 is engaged to the end 28 of the valve 27.

in repairing a break on a windshield, for instance, the seal 13 is preferably centered over the center of the break.

Oftentimes breaks, particularly in windshields, for a pinpoint with a loose cone of glass inside. The present invention is not limited to repairing such limited types of breaks. As long as the seal 13 can form an airtight seal between the open cracks in the glass, the apparatus and method are effective.

Once the seal 13 is placed, the pedestal 11 is engaged with the chamber 23 over the opening 20 in the seal 13. The resin is then placed in the chamber 23.

The resin is selected as one to be clear when dried. Various resins may be used, such as a transparent epoxy with a hardener mixed in. This mixture oftentimes is gauged not to cure too fast, so that there is enough time to cycle resin into a break. Also employable are single component clear resins, such as acrylic resins with photo initiators, which can then be exposed to ultraviolet light once set in place and cured thereby.

The valve 27 is threadedly or frictionally engaged over the recessed portion 24 and collar 26 of the syringe 12. The upper portion 29 opens to a barrel 25. Rotatably engaged within the barrel 25 is a rotor 42, as shown in FIGS. 2a–c. The rotor 42 has a T-opening 43 and a handle 44. There is another opening 45 from the barrel 25.

When the handle 44 is in substantially horizontal position, as shown in FIG. 2a, the T-opening 43 opens through the upper portion 29 to the inner portion of the valve end 28. The third opening of the T is against the inside of the barrel 25. Thus, depression of the stem 31 and the plunger 30 pumps pressure through the valve 27, which may pass through the tube 41.

When the handle 44 is in the position as shown in FIG. 2b, one opening of the T-opening 43 is open to the inside of the body 34 of the syringe 12. Another opening of T-opening 43 is open to the valve 27 opening 45, while the last opening of the T-opening 43 opens to the closed portion of the barrel 25. Thus, the valve 27 in that position vents the syringe to atmosphere, or intakes from atmosphere, depending upon the movement of the stem 31 and plunger 30.

As shown in FIG. 2c, with the handle 44 substantially vertical, the T-opening 43 opens to the end 28 of the valve 27, and to the opening 45, with the third end of the T-opening 43 adjacent to the closed end of the barrel 25. Thus, the inside of the body 34 is closed off and the valve 27 is vented to the atmosphere and to the valve end 28 and/or tubing 41.

In use, the tubing is connected to the end 28 of the valve 27 at one end and connected to the recessed portion of the neck 22 of the pedestal 11 with a cap 46, which engages the tube 41 in the neck 22.

The air in the glass break must be removed in order to get the resin to flow into the break and also fill the striation of the break.

The first step is to move the handle 44 into a vertical position, as shown in FIG. 2b, then depress the plunger 30 as far as it can go, then move the handle 44 into the position as shown in FIG. 2a and withdraw the plunger 30 and engage the notch 32 with the latch 36. Where the pedestal is transparent, the air from the break can be seen bubbling through the resin.

In order to increase the vacuum, the valve 27 now enables further drawing of vacuum. The handle 44 is again moved to its vertical position as shown in FIG. 2b. The stem 31 is released from its engagement with the latch 36 and plunger 30 on the stem 31 is depressed within the syringe. By doing this, air within the body 34 of the syringe 12 is expelled through the T-opening 43 and through the opening 45. The handle 44 is then again moved horizontally to the position as shown in FIG. 2a and the plunger 30 on the stem 31 again withdrawn and the lower notch 32 engaged with the latch 36, repeating the first procedure.

By this procedure, a cumulative drawing of vacuum can be had to maximize the amount of air drawn from the crack and to speed up the procedure.

After ten to fifteen minutes, or after the bubbles seem to diminish pressure may be applied.

The handle 44 is moved to a horizontal position, as shown in FIG. 2a. The plunger 30 is then pushed downward and locked, held at the stem 31 in notch 33. The handle 44 is then moved to a vertical position, as shown in FIG. 2b, venting the T-opening 43 to the atmosphere so that the plunger 30 on the stem 31 may be withdrawn after releasing the engagement of the latch 36 with the notch 33. The handle 44 is then again moved to a horizontal position, as shown in FIG. 2a. The amount of pressure that can be applied is somewhat limited since the turning of the handle 44 to the horizontal position as shown in FIG. 2a releases a back pressure to fill the body 34 of the syringe 12. The plunger 30 on the stem 31 is then depressed with the notch 33 again being engaged with the latch 26, so that pressure may be reapplied to force the remaining resin into the break and striations. The procedure may be repeated until satisfactory results have been obtained.

Selected use of the vacuum and pressure may be applied, as deemed necessary. Accumulations of drawn vacuum, reapplication of pressure and some accumulating of pressure may be selected to need.

The vacuum cycle both draws out the air and replaces it with the resin. The vacuum cycle will get most of the resin into the break and even into the striations. The resin, once in the striations, gives a uniform refraction and generally clear visibility through the striation and break. Much of what has to be done can be determined by inspection of the break.

When using an epoxy resin with a hardener, the resin continually thickens. Ultimately, the vacuum or pressure has little or no effect. At this time, the syringe 12 may be removed. When using epoxy resin, it may be desireable to leave the pedestal 11 on until the resin is fully cured. The chamber 23 then acts as a reservoir to hold the resin and mold a bead (not shown). When the resin is fully cured, the pedestal 11 is removed and a bead is left. The bead can be removed by cutting with a razor, leaving a smooth surface with the glass and good visibility through the repaired break.

When using a single component acrylic resin with a photo initiator, once the resin has been satisfactorily engaged in the break, the resin may be treated with ultraviolet light in order for it to harden in place and complete the repair.

It has been found that the tube 41 will neither collapse nor burst under high vacuum or pressure. The tube 41 can extend a very substantial length, thus, enabling the placement of the pedestal 11 over the glass break, then being able to carry the syringe 12 the necessary distance, such as to the inside of a vehicle, so that the break 14 and the resin being introduced may be observed from the other side of the glass, while the procedure of carrying out the repair is performed remotely. This gives a more accurate control over the repair and enables better gauging of vacuum draning and pressure applying in accordance with the needs of the particular break.

Heretofore, in the prior art, while the use of tubing was available as disclosed in U.S. Pat. No. 4,200,478, there was no way of accumulating vacuum in excess of one pull or push of the plunger 30 of a syringe 12 within the body 34. While this prior one pull technique worked, the present technique unexpectedly extends the utility of the syringe 12, including improving the speed of operation, quality of work and effectiveness with regard to the removal of air bubbles and the dispersion of the resin. Pressure can be reapplied after vacuum has been accumulated and some pressure may be accumulatable.

Where the hole is through the entire glass, a closure to the break in the glass is provided by a sealing patch applied on the opposition surface of the break. It is preferable to have a support over the patch so that the vacuum cycle does not indent part of the patch into the break, leaving a mark in the repair. The support may be a piece of aluminum or steel, for instance, or even a piece of Masonite ®.Masonite ® is a registered trademark for a fiberboard.

The seal 13 is preferably preapplied to the pedestal 11. In use, it is preferable to have a release paper (not shown) over the adhesive 17, the release being removed at the time that the pedestal is placed over the break 14 at the seal opening 20.

The syringe 12 is reusable. The pedestal 11 may be discarded or cleaned and a new seal 13 applied for the purpose of reuse if desired.

The terms and expressions which are employed are used as terms of description; it is recognized, though that various modifications are possible.

It is also understood the following claims are intended to cover all of the generic and specific features of the invention herein described; and all statements of the scope of the invention which as a matter of language, might fall therebetween.

Having described certain forms of the invention in some detail, what is claimed is:

1. Improved apparatus for repairing a break in glass enabling a syringe to accumulate vacuum and pressure comprising a pedestal, said pedestal including a flange portion, a chamber in said pedestal, said chamber having two openings, one said opening in said flange portion, said other opening including means for receiving a syringe in airtight engagement, said chamber of sufficient size to be a reservoir for glass repair resin, adhesive sealing means to seal said pedestal at said flange in airtight engagement over a break in glass with said chamber in substantial communication with said glass break, a syringe, said syringe including a plunger with a stem, retaining means to retain said stem in a selected fixed position in relation to the body of said syringe, and valve means; said valve means in airtight engagement between said chamber and said syringe; said valve means including a position to seal said syringe and vent said chamber to the atmosphere; said valve means further including a position to communicate said syringe with said chamber, whereby a downward plunger motion pressurizes the resin and an upward plunger motion creates a vacuum between said break and said plunger; said valve means further including a position to seal said chamber and vent said syringe to the atmosphere, whereby a downward plunger motion vents air to the atmosphere, whereby said syringe is actuated to accumulate vacuum and pressure for the infusion of a repair resin into a break in glass.

2. The invention of claim 1 including tubing in airtight engagement between said valve and said chamber.

3. The invention of claim 2 wherein said valve includes one portion adapted to engage said syringe in airtight engagement and another portion adapted for airtight engagement with said tubing.

4. The invention of claim 1 wherein said valve includes threaded means adapted to engage said syringe.

5. The invention of claim 1 wherein said valve includes a rotor and handle means.

6. The invention of claim 5 wherein said rotor includes a T opening.

7. the invention of claim 6 wherein said rotor is rotatable in a barrel.

8. An improved method for enabling a syringe to accumulate vacuum and pressure for repairing a break in glass comprising the steps of providing a pedestal, said pedestal including a flange portion; providing a chamber, said chamber of sufficient size to act as a reservoir for glass repair resin; said chamber having two openings, one said opening in said flange portion and said other opening functionally engagable with a syringe; providing a syringe, said syringe including a plunger with a stem and stem retaining means; providing valve means, said valve means selectively actuatable to communicate said syringe with said chamber or to seal said syringe and vent said chamber to the atmosphere or to seal said chamber and vent said syringe to atmosphere; adhesively sealing said pedestal at said flange in airtight engagement over a break in glass with said chamber in substantial communication with said glass break; providing glass repair resin to said chamber; and engaging said valve means in airtight engagement between said chamber and syringe including the steps of:

(a) actuating said plunger on said stem to move said plunger to the lower part of the body of said syringe, (b) actuating said valve means to communicate said syringe with said chamber, (c) actuating said plunger on said stem to move said plunger to the upper portion of the body of said syringe, (d) retaining said stem in said upper portion of said body of said syringe, (e) actuating said valve to seal said chamber and vent said syringe to atmosphere, (f) actuating said plunger on said stem to move said plunger to the lower part of the body of said syringe, (g) actuating said valve means to communicate said syringe with said chamber, then selectively repeating steps (a) through (f) until a selected vacuum has been obtained, whereby said resin is infused into said break in said glass.

9. The method of claim 8 including the steps of;

(h) actuating said valve to seal said chamber and vent said syringe to atmosphere.

(i) actuating said plunger on said stem to move said plunger to the upper portion of the body of said syringe.

(j) actuating said valve means to communicate said syringe with said chamber, (k) actuating said plunger on said stem to move said plunger to the lower part of the body of said syringe, (l) actuating said valve to seal said chamber and vent said syringe to atmosphere, selectively repeating steps (h) through (l) until a selected pressure has been obtained, whereby said resin is forced into said break in said glass.

10. The method of claim 8 including the step of providing tubing and affixing said tubing in airtight engagement between said valve and said chamber.

11. The method of claim 8 including the step of providing said valve including threaded means adapted to engage said syringe.

12. The method of claim 8 including the step of providing said valve including a rotor and handle means.

13. The method of claim 12 including the step of providing said rotor including a T opening.

14. The method of claim 12 including the step of providing a barrel, said rotor rotatable in said barrel.

* * * * *

UNITED STATES PATENT AND TRADEMARK OFFICE
CERTIFICATE OF CORRECTION

PATENT NO.   :   4,961,883
DATED        :   October 9, 1990
INVENTOR(S)  :   Gerald Jacino, et al It is certified that error appears in the above-identified patent and that said Letters Patent is hereby corrected as shown below:

Column 4, line 35, insert and change "i" to -- I --
Column 4, line 38, insert and change "for" to -- form --
Column 5, line 17, insert and change "in" to -- In --
Column 7, claim 7, line 51, insert and change "the to -- The --
Column 8, claim 8, line 1, after "stem" first occurrence insert -- ; --
Column 8, claim 9, line 33, insert and change ";" to -- : --
Column 8, claim 9, line 35, after "atmosphere" insert and change "." to -- , --
Column 8, claim 9, line 38, after "syringe", insert and change "." to -- , --

Signed and Sealed this

Nineteenth Day of May, 1992

Attest:

DOUGLAS B. COMER

*Attesting Officer*                *Acting Commissioner of Patents and Trademarks*